United States Patent [19]

Witte et al.

[11] Patent Number: 4,543,666

[45] Date of Patent: Sep. 24, 1985

[54] OPTICAL COUPLER NETWORK FOR COUPLING A PLURALITY OF SUBSCRIBER TRANSMITTERS TO A PLURALITY OF SUBSCRIBER RECEIVERS BY MEANS OF OPTICAL STAR COUPLERS

[75] Inventors: Hans-Hermann Witte; Manfred Rohler, both of Munich, Fed. Rep. of Germany

[73] Assignee: Siemens Aktiengesellschaft, Berlin & Munich, Fed. Rep. of Germany

[21] Appl. No.: 534,253

[22] Filed: Sep. 21, 1983

[30] Foreign Application Priority Data

Sep. 23, 1982 [DE] Fed. Rep. of Germany ....... 3235253

[51] Int. Cl.$^4$ ................................................. H04B 9/00
[52] U.S. Cl. .................................. 455/612; 350/96.16; 370/1; 455/607
[58] Field of Search ............... 455/612, 610, 601, 606, 455/607; 350/96.15, 96.16, 96.19; 370/1, 4

[56] References Cited

U.S. PATENT DOCUMENTS 4,062,043  12/1977  Zeidler et al. ................. 455/612
4,090,067   5/1978  Bell, III et al. ................ 455/612
4,417,334  11/1983  Gunderson et al. ............... 370/1

OTHER PUBLICATIONS

Farrington et al.-"An Optical Fiber Multiterminal"-Fiber and Integrated Optics-vol. 2, No. 2, 1979, pp. 173-193.

Porter-"An Experimental Fiber Optic Data Bus"-Boeing Comm. Airplane Co.-We-5.1-5.13, Feb. 1978.

D. C. Johnson et al., "Low-Loss Optical Coupler Network for Coupling a Plurality of Subscriber Transmitters to a Plurality of Subscriber Receivers by Means of Optical Star Couplers", Appl. Phys. Lett., vol. 35, No. 7, Oct. 1, 1979, pp. 479-481.

*Primary Examiner*—Joseph A. Orsino, Jr.
*Attorney, Agent, or Firm*—Hill, Van Santen, Steadman & Simpson

[57] ABSTRACT

A coupler network for coupling N subscriber transmitters to N (=n·m) subscriber receivers is disclosed. The system exhibits m star couplers each having respectively N transmitter-side input ports for the connection of the N subscriber transmitters and having respectively N receiver-side output ports for connection with respectively N/m subscriber receivers of the N subscriber receivers. In order to reduce the line attenuation of this echo-free coupler network, each subscriber transmitter is connected to a plurality of star coupler input ports and a detector of each star coupler receiver is connected to a plurality of star coupler output ports. A lens system or a fiber taper which make it possible for more light to be coupled in or out (than for individual fibers) is employed for coupling a plurality of star coupler input ports to a subscriber transmitter and/or for coupling a plurality of star coupler output ports to a detector of a subscriber receiver. The specific case N=64, m=4 is illustrated in the drawing.

25 Claims, 4 Drawing Figures

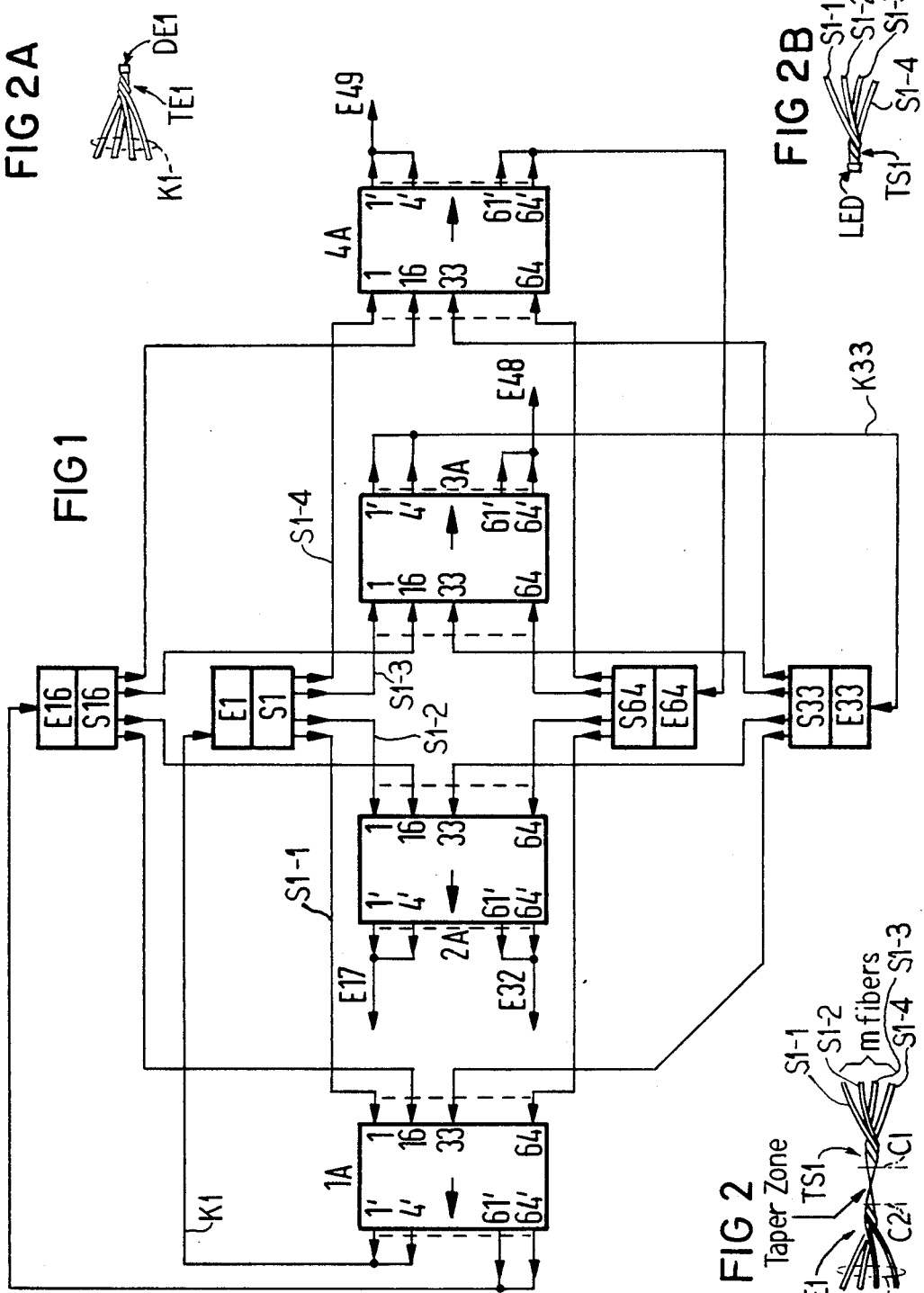
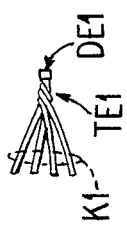
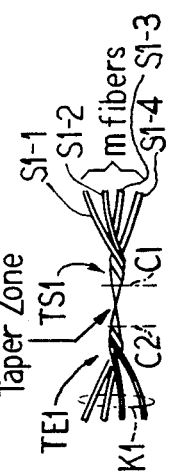

OPTICAL COUPLER NETWORK FOR COUPLING A PLURALITY OF SUBSCRIBER TRANSMITTERS TO A PLURALITY OF SUBSCRIBER RECEIVERS BY MEANS OF OPTICAL STAR COUPLERS

BACKGROUND OF THE INVENTION

The present invention relates to an optical coupler network for coupling a plurality of subscriber transmitters to a plurality of subscriber receivers by means of optical star couplers. In case the network is used in computer systems, each transmitter and/or receiver location would be associated with a computer to form a computer node of the network.

A coupling network of this type is proposed in the German published patent application No. P 31 23 445.3 (VPA 81 P 7054 DE). No "echoes", i.e., constantly circulating data packets, occur given this coupler network, as is the case given coupler networks comparable in terms of the number of subscribers (nodes) with only one star coupler. The proposed coupler network, however, can exhibit a considerably higher line attenuation in comparison to coupler networks having only one coupler.

SUMMARY OF THE INVENTION

The object of the invention is to create a coupler network of the type specified which can exhibit reduced line attenuation.

This object is resolved by providing at least one node transmitter which transmits its optical output to a plurality of star coupler input ports, and/or providing at least one node receiver which receives its optical input from a plurality of star coupler output ports.

The line attenuation can be reduced by means of an inventive coupler network in comparison to a coupler network having only one star coupler, namely, because more of the light emitted by a node transmitter can be made usable.

According to a further feature, a node transmitter which is connected to a plurality of star coupler input ports, preferably consists of a light-emitting diode.

A coupling of a node transmitter or of a node receiver as well, to a plurality of star coupler input ports or, respectively, output ports, can be effected by means of an optical lens system or a fiber optic taper configuration.

Given employment of a taper, one expediently utilizes a taper formed by fusing a plurality of fiber optical waveguides, the taper having an end face confronting the light emitting surface of the transmitter or the light reception surface of the receiver.

An inventively echo-free coupler network wherein node transmitters as well as node receivers are to be connected to a plurality of star coupler input ports and, respectively, output ports, is formed when each transmitter is connected with a respective input port of each of a group of optical star couplers.

A preferred execution of this echo-free coupler network is one wherein each star coupler of a group has equal numbers of input and output ports.

An advantageous development of a coupler network of the modular type is one where spacially separate modules can be placed at different levels as needed. This enables the reduction or limitation of the number of input or, respectively, output ports of the star couplers employed.

The invention is described in greater detail below with reference to the Figures on the accompanying drawing sheet; and other objects, features and advantages will be apparent from this detailed disclosure and from the appended claims.

BRIEF DESCRIPTION OF THE DRAWING

FIG. 1 in a schematic illustration, shows an embodiment of an inventive coupler network; and FIG. 2 shows a preliminary stage of a taper to be employed in the embodiment of FIG. 1; FIGS. 2A and 2B show tapers in use.

DETAILED DESCRIPTION

In the embodiment illustrated in FIG. 1, N=64 subscribers (or nodes) are distributed to m=4 star couplers. Respectively m=4 fiber optical waveguides lead from each subscriber transmitter S1 through S64 to a respective input port of each of the m couplers. At the output of each of the m star couplers, the power from each respective m output ports of a star coupler (which power may be transmitted via m fibers of a fiber optic transmission cable) is supplied to a detector of a respective one of the subscriber receivers E1 through E64. (All N subscriber receivers could also each be connected to a respective output port of all m star couplers. In this manner, too, m lines again lead to each subscriber receiver. By means of this arrangement, all N subscribers each consisting of a subscriber transmitter and a subscriber receiver could still communicate with one another, even should some coupler or other fail; however, the line attenuation increases in accord with the number of coupler outages.) The network illustrated in FIG. 1 is echo-free.

In the example illustrated in FIG. 1, respectively N/m=16 subscribers couple over different star couplers 1A through 4A. The number of subscribers coupled via a bus system, of course, can be increased according to this principle. The system is then to be continued in a vertical direction so that modular groups each consisting of m star couplers are disposed above one another or in various levels.

When, for example, for technological reasons, it does not seem meaningful to manufacture a single star coupler with more than N input ports and N output ports, but, for example, one would still like to allow 2N subscribers to communicate over a bus system, then a second level with m additional two x 64 port (128 port) star couplers is connected in a vertical direction to the first level coinciding with the plane of the drawing of FIG. 1 and the number of fibers emerging from the subscriber transmitters is correspondingly increased.

If, for example, N=128 subscribers (or nodes) and m=4, then 16 respective subscribers could again couple over one star coupler with 64 input ports and 64 output ports. The number of fibers respectively departing each subscriber transmitter would then be eight.

The coupler network utilizing an optics configuration as explained in reference to FIG. 2 enables a lower line attenuation (line attenuation is the ratio between the overall power of the LED and the power arriving at the detector expressed as a logarithmic quantity) to be achieved given employment of LEDs (light-emitting diodes) as subscriber transmitters in comparison to the traditional case of a network having the same number of subscribers with a single star coupler wherein each of the number of input ports and the number of output ports is equal to the number of subscribers.

That can be achieved in that an optics adaptation system such as a lens system or a taper is employed in the coupling between the LED and fiber optical waveguide. Given employment of tapers, the plurality of fibers to be connected are placed in intimate mechanical contact along a specific path and the fibers are softened at that location while they are simultaneously being pulled apart. A zone of changing cross-section, the so-called taper zone, is formed (v., for example, Johnson et al, Appl. Phys. Lett. 35 (7), 1 October, 1979, p. 479). A fused biconical taper zone produced in this manner is indicated in FIG. 2. The taper zone is cut at a location such as C1 or C2, FIG. 2, where the desired cross-section exists. The cross-section e.g. at C1, FIG. 2, should not be smaller than the emitting surface of the source at the transition from the LED to the plurality of fibers. At the transition of the plurality of fibers to the detector surface, the diameter of the cross-section of, for example, a round taper zone e.g. at C2, FIG. 2, should be approximately equal to the edge length of the sensitive surface of the detector.

The taper angle must be designed such that, given excitation over the taper end face e.g. at C1, FIG. 2, the light departing along the fibers of the bundle corresponds to a guided mode spectrum.

When coupling a LED to an individual fiber over the planar fiber end face, only a few percent of the overall power emitted by the LED is coupled into the fiber. The cause for this is that the product of the cross-section of the LED and the square of the sine of the angle of radiation of the LED is greater than the product of the area of an individual fiber and the square of the numerical aperture of the fiber. When the angular spectrum of the LED is reduced by means of an optics adaptation system, that is a lens system or something equivalent, for example, the aforementioned taper (formed from one section of the biconical taper of FIG. 2), being reduced to the angular spectrum corresponding to the numerical aperture of the fiber, then the image of the emitting LED surface is magnified in comparison to the actual emitting surface of the LED. When one assumes that 100 μW are coupled into a fiber by an LED, then, leaving scatter and absorption losses out of consideration, fifty fibers can then be theoretically excited by a Burrus LED with 100 μW each because the overall radiation of the LED amounts to at least 5 mW. Practically, approximately ten fibers can be excited with 100 μW each. As one can derive from the sine condition, $\phi_{LED} \cdot \sin 60 = \phi'_{LED} \cdot \sin 12$, the diameter of the taper of a fused area of the fiber bundle (e.g. one section of the biconical taper of FIG. 2) must expand to $\phi_{LED} = 200$ μm when it exhibits a diameter $\phi_{LED} = 50$ μm at its narrowest location which corresponds to the end face (e.g. at C1, FIG. 2) facing the LED and the angle of radiation of the LED amounts to ±60° and the numerical aperture of the fiber amounts to 0.2. When the diameter of the fibers amounts to 140 μm, one thus theoretically requires only two fibers in order to entirely capture the LED radiation. And indeed all of the LED radiation will be captured with ten fibers. A corresponding taper formation thus produces an input loss lower by approximately 20 dB at the transition between a LED and a fiber bundle than given direct coupling between a LED and an individual fiber.

It can be further achieved that the light of many fibers—given the usual numerical apertures of the fibers and a light-sensitive detector surfaces of 1 mm², the number of these fibers is greater than fifty—is simultaneously imaged on the light-sensitive surface of the detector. For fibers having 140 μm, approximately fifty fibers can already directly couple to the detector when the fibers are fused into a rod at their one end and the end face of said rod (e.g. at C2, FIG. 2) is positioned directly in front of the detector.

Instead of conducting the power of a plurality of neighboring output ports of one coupler to one detector, non-adjacent output ports of a coupler can also be employed. The uniformity of the power at the detectors is thereby increased.

The proposed, passive coupler network can be expanded to a number of subscribers greater than one hundred.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

SUPPLEMENTARY DISCUSSION

According to a first feature of the present invention, at least one subscriber transmitter (S1, S2, . . . , S64) is connected to a plurality of star coupler input ports. For example each of the star couplers 1A, 2A, 3A and 4A has sixty-four input ports, the transmitter S1 being shown in FIG. 1 as being connected to supply a common signal to input port number one of each of the four star couplers. In addition, or alternatively, at least one receiver is connected to a plurality of star coupler output ports. In FIG. 1, each of the star couplers 1A through 4A has sixty-four output ports. Output ports 1' through 4' of star coupler 1A, for example, are shown as being connected with receiver E1 so that receiver E1 receives a common signal from all four output ports and the total received signal intensity is essentially four times the output power transmitted by an individual output port.

According to a second feature of the invention, the transmitter such as transmitter S1 which is connected to a plurality of star coupler input ports consists of a light-emitting diode which is coupled to each of the fiber optic lines leading to the respective input ports for example as described in relation to FIG. 2.

A third feature of the present invention which may be combined with feature no. 1 and/or no. 2 resides in a subscriber transmitter or subscriber receiver connected to a plurality of of star coupler input ports or respectively output ports, via a plurality of fiber optical waveguides, the plurality of fiber optical waveguides being coupled to the subscriber transmitter or, respectively, to a detector of the subscriber receiver by means of a lens system or a taper such as described in connection with FIG. 2.

A fourth feature of the invention which may be combined with feature no. 3 is characterized in that the plurality of fiber optical waveguides are fused into a taper such as indicated by the left-hand section or by the right-hand section of FIG. 2, the taper exhibiting an end face (e.g. at C1, FIG. 2) which is to be disposed in confronting relation to the light-emitting surface of each subscriber transmitter or, respectively, the taper exhibiting an end face such as indicated for the left section in FIG. 2 at C2 which confronts the light reception surface of a subscriber receiver.

In accordance with a further feature of invention, a plurality of star couplers such as 1A through 4A and a corresponding set (e.g. 1B through 4B, not shown) are combined into respective spatially separate modular groups or layer structures which are disposed at respective different levels (e.g. with the star couplers of the first group lying in one plane such as respresented in FIG. 1, and the plurality of star couplers forming the second modular group lying in a second plane superimposed or offset parallel to the first modular group so as to form a compact stack of said modular groups of compact overall configuration).

According to another feature of the invention, a coupler network according to any of the preceeding features can be utilized in a data bus system for guidance and weapons deployment systems, particularly on board ships or aircraft.

By way of example, the connections between the sets of output ports and the respective receivers may take the form of cables such as indicated at K1 in FIGS. 1 and 2 including for example four individual optical fibers which terminate in a taper such as indicated at TE1, FIG. 2, leading to the light-sensitive detector surface of the receiver E1. Similarly, the light-emitting surface of each transmitter such as S1 may confront an end face of a taper such as indicated at TS1, FIG. 2, for essentially equally distributing a common output signal to the respective individual fibers such as S1-1 through S1-4, FIG. 2, which lead to the first input ports of the respective star couplers 1A through 4A, FIG. 1. As a further example, a cable K33 with four optical fibers leads from the four output ports 1' through 4' of star coupler 3A to the receiver E33 shown at the lower part of FIG. 1

FIGS. 2A and 2B diagrammatically indicate the taper TE1 of FIG. 2 in physical association with the light reception surface of a light sensitive detector DE1 of an optical receiver such as E1, and the taper TS1 in physical association with the light emitting surface of a light emitting diode LED of an optical transmitter such as S1.

For the case of 128 subscribers and two layers of star couplers (e.g. 1A through 4A, and 1 B through 4B), the eight output lines of each transmitter (S1 through S128) could go to a respective input port of each of the eight star couplers. Thus each star coupler would have 128 input ports, but only 64 output ports.

For the case of 128 subscribers (or nodes) and eight star couplers each with 64 input ports and 64 output ports, four transmitter lines from each of 64 of the transmitters could lead to the four star couplers of a first modular layer and the four transmitter lines from each of the other 64 of the transmitters could be connected to the input ports of the four star couplers of the second modular layer. In this case, two output ports from the first modular layer and two output ports from the second modular layer could lead to each receiver. Then if a transmitter connected with the first modular layer is active, the output signal is transmitted via two output ports of the first modular layer to each of the 128 receivers, the number of output ports of the first modular layer being four×64 or 256. Similarly if one of the transmitters connected to the second modular layer is active, the output signal is transmitted via two output ports each to all of the 128 receivers.

We claim as our invention:

1. An optical coupler network having a plurality of nodes with node transmitters and node receivers,
   a plurality of optical star couplers having star coupler input ports connected with said node transmitters and having star coupler output ports connected with said node receivers, for coupling the node transmitters with the node receivers,
   at least one node transmitter being connected to a plurality of star coupler input ports, and
   at least one node receiver being connected to a plurality of star coupler output ports,
   each of a plurality of node transmitters being connected with at least one respective star coupler input port of each of a plurality of optical star couplers forming a group of optical star couplers,
   the plurality of optical star couplers of said group having a given number of node transmitters connected to the input ports thereof, each optical star coupler having a number of input ports equal to said given number of node transmitters,
   the plurality of optical star couplers of said group having a plurality of sets of node receivers connected with the output ports thereof, and a respective plurality of the output ports of said group of optical star couplers being connected to each respective one of said node receivers,
   said optical star couplers of said group forming an echo-free optical coupling network, and
   each optical star coupler of said group having its output ports connected to a respective different set of node receivers.

2. A coupler network according to claim 1, wherein a node transmitter which is connected to a plurality of star coupler input ports, comprises a light-emitting diode.

3. A coupler network according to claim 1, with a plurality of fiber optical waveguides receiving a common optical signal and being connected to respective star coupler input ports, a node transmitter supplying the common optical signal to said plurality of fiber optical waveguides and having optical adaptation means to adapt the emitting cross section of the node transmitter to the combined cross sections of the plurality of fiber optical waveguides.

4. A coupler network according to claim 3, wherein the plurality of fiber optical waveguides are fused into a taper at one end to provide said optical adaptation means, said taper having an end face disposed opposite the light-emitting surface of the node transmitter.

5. A coupler network according to claim 1, with a plurality of fiber optical waveguides transmitting a common optical signal, and being connected to respective star coupler output ports, a node receiver for receiving the common optical signal via said plurality of fiber optical waveguides and having optical adaptation means for imaging the common optical signal from said plurality of fiber optical waveguides onto the detector surface of the node receiver.

6. A coupler network according to claim 5, wherein the plurality of fiber optical waveguides are fused into a taper at one end to provide said optical adaptation means, said taper having an end face disposed opposite the light reception surface of said node receiver.

7. A coupler network according to claim 1, wherein respective pluralities of optical couplers form respective modular groups disposed at respective different levels while all being connected to a common set of node transmitters.

8. An optical coupler network according to claim 1, with the plurality of optical star couplers having a plurality of output ports connected to each node receiver such that substantially a multiple of the output power of one output port is delivered to each node receiver whenever any of the node transmitters connected with said plurality of optical star couplers transmits a signal thereto.

9. A coupler network according to claim 1, wherein the node transmitters and receivers are components of a guidance and weapons deployment system.

10. A coupler network according to claim 15, where the optical couplers form a passive data bus system providing interconnection of the node receivers with the node transmitters without requiring optical repeaters, the data bus system being carried on board a mobile vehicle.

11. An optical coupler network having a plurality of nodes with node transmitters and node receivers, optical star couplers having star coupler input ports connected with said node transmitters and having star coupler output ports connected with said node receivers, for coupling the node transmitters with the node receivers, and
at least one node transmitter being connected to a plurality of star coupler input ports for transmitting a common signal to all of the output ports of a group of said optical star couplers,
each optical star coupler of said group having a set of node receivers connected with the output ports thereof,
said optical star couplers of said group forming an echo-free optical coupling network,
each node receiver of each set of node receivers being connected with only one optical star coupler of said group, and
each optical star coupler of said group having a plurality of output ports thereof connected with each respective one of the node receivers of the set of node receivers connected therewith.

12. An optical coupler network having a plurality of nodes with node transmitters and node receivers,
a plurality of optical star couplers having star coupler input ports connected with said node transmitters and having star coupler output ports connected with said node receivers, for coupling the node transmitters with the node receivers, and
at least one node receiver being connected to a plurality of star coupler output ports for receiving a common signal from each of said plurality of star coupler output ports,
said optical star couplers forming an echo-free optical coupling network,
a plurality of sets of node receivers with each set being connected to the output ports of only one associated optical star coupler, and
each node receiver of each set being connected to a plurality of star coupler output ports of the one associated optical star coupler.

13. An optical coupler network according to claim 12, with each node transmitter of a group of node transmitters being connected to a respective input port of each of the optical star couplers of a group of optical star couplers associated with the plurality of sets of node receivers, such that a common signal from any one of the node transmitters of said group of node transmitters is transmitted via a plurality of star coupler output ports to each node receiver of said plurality of sets of node receivers.

14. An optical coupler network according to claim 13, wherein each node transmitter comprises a single light-emitting diode having its output coupled to a respective input port of each of said group of optical star couplers.

15. An optical coupler network according to claim 13, with each node transmitter having a plurality of fiber optical waveguides for receiving a common optical signal therefrom, the plurality of fiber optical waveguides having optical adaptation means to adapt the emitting cross section of the associated node transmitter to the combined cross sections of the plurality of fiber optical waveguides.

16. An optical coupler network according to claim 15, wherein the plurality of fiber optical waveguides of each node transmitter are fused into a taper at one end to provide said optical adaptation means, said taper having an end face disposed opposite the light-emitting surface of the node transmitter.

17. An optical coupler network according to claim 13, with each optical star coupler of said group having a plurality of fiber optical waveguides transmitting a common optical signal to each node receiver of a respective one of said sets of node receivers, each node receiver of said sets of node receivers having optical adaptation means for imaging the common optical signal from said plurality of fiber optical waveguides onto the detector surface of the node receiver.

18. An optical coupler network according to claim 17, wherein the plurality of fiber optical waveguides leading to each respective node receiver are fused into a taper at one end to provide said optical adaptation means, said taper having an end face disposed opposite the light reception surface of said node receiver.

19. An optical coupler network according to claim 13, wherein respective groups of optical couplers form respective modules disposed at respective different levels while all being connected to a common set of node transmitters.

20. An optical coupler network according to claim 12, with the plurality of optical star couplers having a plurality of output ports connected to each node receiver such that substantially a multiple of the output power of one output port is delivered to each node receiver whenever any of the node transmitters connected with said plurality of optical star couplers transmits a signal thereto.

21. An optical coupler network according to claim 12, wherein the node transmitters and receivers are components of a guidance and weapons deployment system.

22. An optical coupler network according to claim 21, where the optical star couplers form a passive data bus system providing inter-connection of the node receivers with the node transmitters without requiring optical repeaters, the data bus system being carried on board a mobile vehicle.

23. An optical coupler network according to claim 13, with each optical star coupler of said group having a given number of input ports at an input side and a corresponding number of output ports at an output side thereof.

24. An optical coupler network according to claim 23, with each optical star coupler of said group having only one input port connected to each node transmitter.

25. An optical coupler network according to claim 24, with each node receiver of each of said sets having the same number of output ports connected therewith.

* * * * *